US010365187B2

(12) United States Patent
Wang et al.

(10) Patent No.: US 10,365,187 B2
(45) Date of Patent: Jul. 30, 2019

(54) METHOD FOR RAPID AND PRECISE MANIPULATION OF A TINY VOLUME OF LIQUID DROPLETS

(71) Applicant: The University of Hong Kong, Hong Kong (CN)

(72) Inventors: Liqiu Wang, Fo Tan (HK); Xin Tang, Pokfield Road Residences (HK)

(73) Assignee: THE UNIVERSITY OF HONG KONG, Hong Kong (CN)

( * ) Notice: Subject to any disclaimer, the term of this patent is extended or adjusted under 35 U.S.C. 154(b) by 254 days.

(21) Appl. No.: 15/494,045

(22) Filed: Apr. 21, 2017

(65) Prior Publication Data

US 2017/0315024 A1 Nov. 2, 2017

Related U.S. Application Data

(60) Provisional application No. 62/329,022, filed on Apr. 28, 2016.

(51) Int. Cl.
*B01L 3/00* (2006.01)
*B65D 83/00* (2006.01)
*G01N 1/14* (2006.01)

(52) U.S. Cl.
CPC .................. *G01N 1/14* (2013.01); *B01L 3/56* (2013.01); *B01L 2400/0478* (2013.01)

(58) Field of Classification Search
CPC ...... B01L 2400/0478; B01L 3/56; G01N 1/14
See application file for complete search history.

(56) References Cited

U.S. PATENT DOCUMENTS

2011/0160643 A1* 6/2011 Dacey, Jr. ................. A61L 2/00 604/21
2016/0160436 A1* 6/2016 Lyons ................... B08B 17/065 442/62

OTHER PUBLICATIONS

Guo, D., Xiao, J., Chen, J., Liu, Y., Yu, C., Cao, M., & Jiang, L. "Superhydrophobic "Aspirator": Toward Dispersion and Manipulation of Micro/Nanoliter Droplets," Small (2015), 11(35), 4491-4496 (Year: 2015).*

Ferraro, P., Coppola, S., Grilli, S., Paturzo, M., & Vespini, V., "Dispensing nano-pico droplets and liquid patterning by pyroelectrodynamic shooting," Nature nanotechnology (2010), 5(6), 429-435.

(Continued)

*Primary Examiner* — Jennifer Wecker
(74) *Attorney, Agent, or Firm* — Leason Ellis LLP

(57) ABSTRACT

An apparatus and method are provided for rapid and precise manipulation and transfer of tiny liquid droplets. by dynamically introducing microstructures with relatively high surface energy to a non-wettable surface, which surface has in-situ switchable adhesion to liquid droplets. By penetrating microstructures on the background surface, the chemical property of the surface is locally modified. Capillary bridges will form between microstructures and liquid droplets which lead to high adhesive forces. When the microstructures are retracted, the capillary bridges either pinch-off or recede, which drastically reduces the adhesion. With proper chemical modification, the surface can either manipulate a liquid droplet in air or in an immiscible carrier liquid. Tiny droplets with volumes down to nanoliter scale can be prepared and dispensed by using the surface.

17 Claims, 5 Drawing Sheets

(56) References Cited

OTHER PUBLICATIONS

Ellson, R., Mutz, M., Browning, B., Lee, L., Miller, M. F., & Papen, R., "Transfer of low nanoliter volumes between microplates using focused acoustics—automation considerations," Journal of the Association for Laboratory Automation (2003), 8(5), 29-34.

Cheng, Z., Lai, H., Du, M., Zhu, S., Zhang, N., & Sun, K., "Super-hydrophobic surface with switchable adhesion responsive to both temperature and pH," Soft Matter (2012), 8(37), 9635-9641.

Hong, X., Gao, X., & Jiang, L., "Application of superhydrophobic surface with high adhesive force in no lost transport of superparamagnetic microdroplet," Journal of the American Chemical Society (2007), 129(6), 1478-1479.

Guo, D., Xiao, J., Chen, J., Liu, Y., Yu, C., Cao, M., & Jiang, L. Superhydrophobic "Aspirator": Toward Dispersion and Manipulation of Micro/Nanoliter Droplets, Small (2015), 11(35), 4491-4496.

Wu, D., Wu, S. Z., Chen, Q. D., Zhang, Y. L., Yao, J., Yao, X., & Sun, H. B., "Curvature-Driven Reversible In Situ Switching Between Pinned and Roll-Down Superhydrophobic States for Water Droplet Transportation," Advanced Materials (2011), 23(4), 545-549.

Wooh, S, et al. (2015)."Synthesis of mesoporous supraparticles on superamphiphobic surfaces." Advanced Materials 27(45): 7338-7343.

Su, B. et al., "A miniature droplet reactor built on nanoparticle-derived superhydrophobic pedestals." Nano Research (2011), 4(3): 266-273.

McLane, J., et al. "Enhanced detection of protein in urine by droplet evaporation on a superhydrophobic plastic," Advanced Materials Interfaces (2015), 7 pages.

* cited by examiner

Fig. 2A
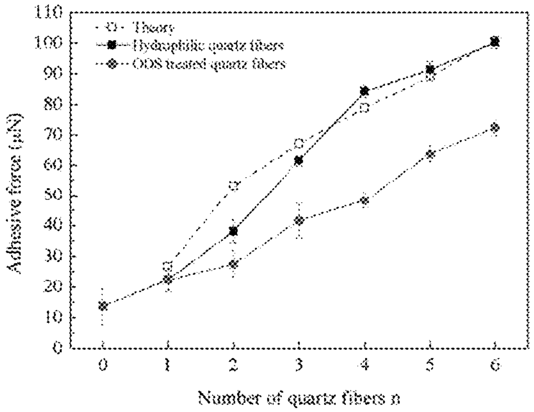
Fig. 2B
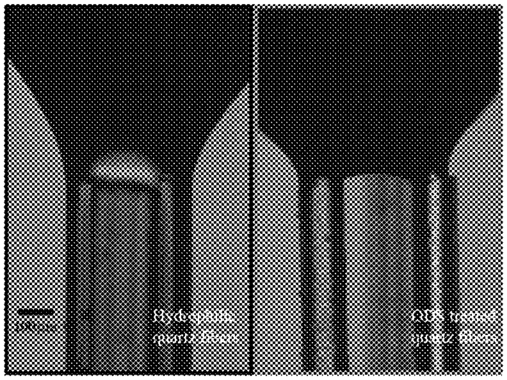
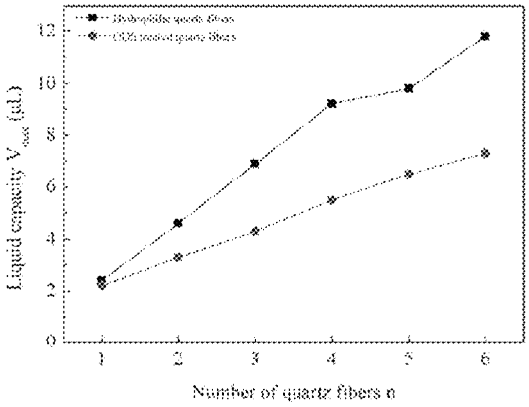
Fig. 2C
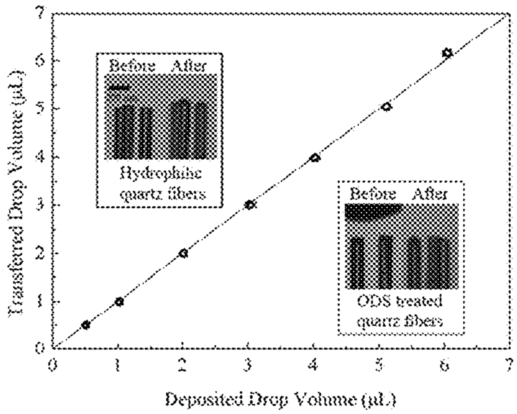
Fig. 2D

Fig. 4A
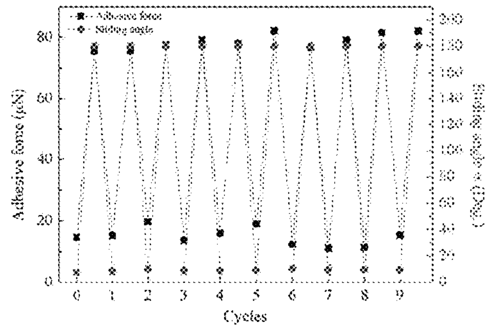
Fig. 4B
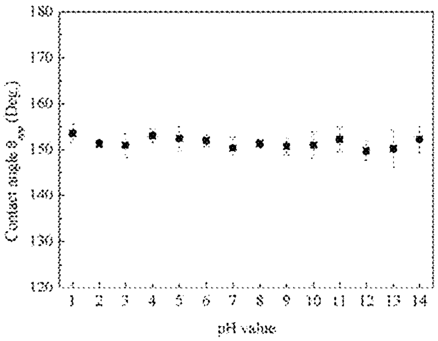
Fig. 5A
Fig. 5B
Fig. 5C
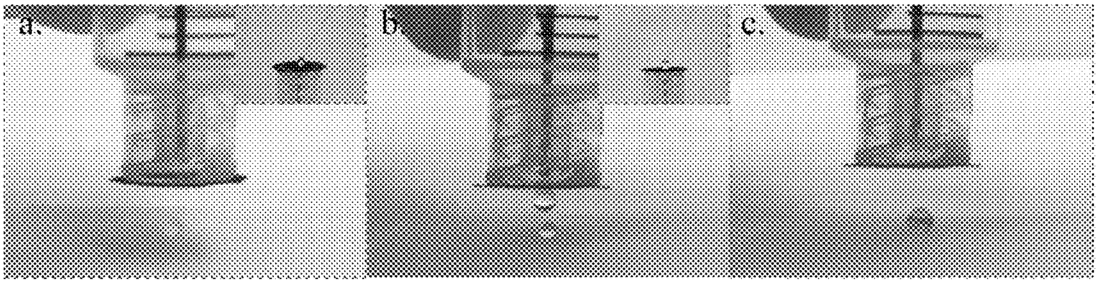

Fig. 6A
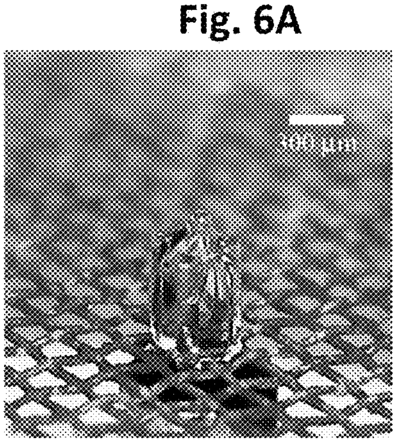
Fig. 6B
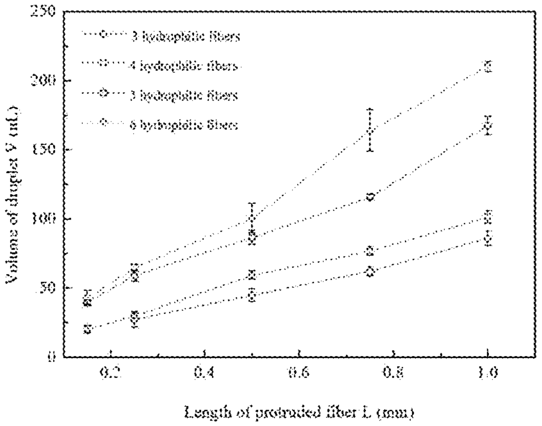
Fig. 6C
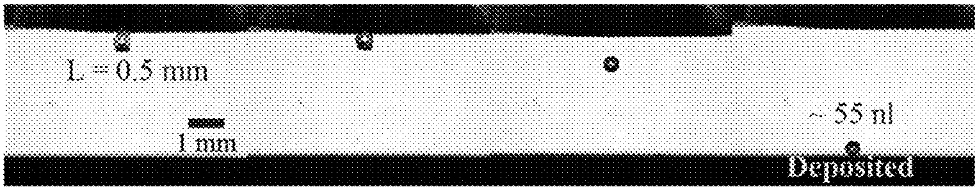
Fig. 7A Fig. 7B Fig. 7C
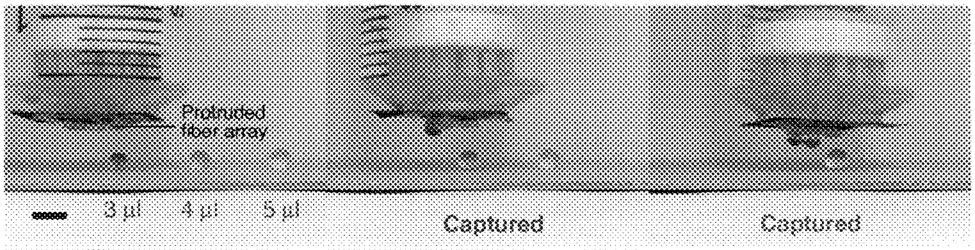
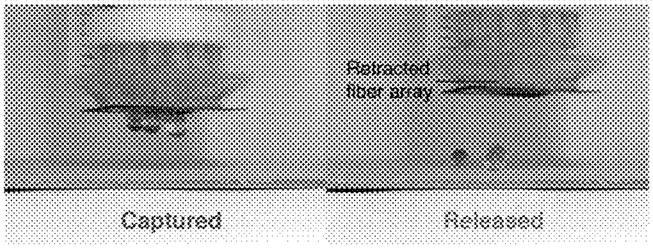
Fig. 7D Fig. 7E

METHOD FOR RAPID AND PRECISE MANIPULATION OF A TINY VOLUME OF LIQUID DROPLETS

CROSS-REFERENCE TO RELATED PATENT APPLICATIONS

This application claims the benefit of U.S. Provisional Application No. 62/329,022 filed Apr. 28, 2016, which is incorporated herein by reference in its entirety.

FIELD OF THE INVENTION

The present invention relates generally to a method for dexterous and precise preparation, transportation and dispersion of tiny volumes of liquid. More particularly, the present invention utilizes a dynamic patterned non-wettable surface with wettability contrast to reversibly switch solid/liquid adhesion.

BACKGROUND OF THE INVENTION

The manipulation and transfer of tiny liquid droplets is an operation that is typically done for the purpose of maneuvering targeted tiny droplets (capture and release) or preparing tiny liquid droplets from a bulk source. Such a manipulation operation is a significant and pragmatic technique that features prominently in both research and industry. Precise and reliable manipulation of droplets is a critical step for chemical and biological reactions and analysis processes, such as microfluidics and micro-reactors. The quality of reacted products and the accuracy of analysis highly depend on precise volume control of manipulation and transfer processes. Manipulation with noticeable liquid loss can lead to unsatisfactory reaction products and erroneous analytical results.

With help of measurement tools, preparing and transferring large amounts of liquid with specific volumes is usually easy. However, for tiny volume liquid droplets, such as those of microliter and nanoliter size, the same processes are difficult due to the relatively considerable surface tension encountered. In particular, in order to capture and manipulate tiny liquid droplets reliably, it is essential that the manipulator provide high liquid/solid adhesion so as to overcome the substantial surface tension of the droplet and to balance the gravitational force acting on the droplet. On the other hand, in order to disperse or release the droplets on a target surface, the liquid/solid adhesion of the manipulator should be greatly reduced so that the droplet will be released due to the prevailing gravitational force. These two seemingly contradictory requirements lead to challenges for tiny droplet manipulation. Moreover, unlike conventional measurement methods with large amounts of liquid residue remain on the measurement tools after the manipulation, in order to control tiny droplet volume precisely, the transfer process for these tiny droplets should be nearly loss-free.

To prepare droplets with volumes down to the nanoliter size, various techniques, including pyroelectrodynamic shooting, piezoelectric nozzle dispersing, and focused acoustics ejection, can be applied. However, none of these techniques can deposit droplets on a liquid-repellent surface reliably due to the low liquid/solid adhesion of such a surface. Although these techniques can aliquot bulk liquid source into small droplets, they cannot manipulate individual droplets on-demand. Such weak maneuverability over droplets makes them inapplicable for applications requiring multistage manipulation, such as micro-reactors and multi-component particle synthesis. Furthermore, these techniques often require expensive components (such as an infrared laser or a focused acoustic transducer) and complicated fabrication processes. See, for example Ferraro, P., Coppola, S., Grilli, S., Paturzo, M., & Vespini, V., "Dispensing nano-pico droplets and liquid patterning by pyroelectrodynamic shooting," *Nature nanotechnology,* 5(6), 429-435 (2010); and Ellson, R., Mutz, M., Browning, B., Lee, L., Miller, M. F., & Papen, R., "Transfer of low nanoliter volumes between microplates using focused acoustics—automation considerations," *Journal of the Association for Laboratory Automation,* 8(5), 29-34 (2003), both of which are incorporated herein by reference in their entirety.

Smart non-wettable surfaces with responsive liquid adhesion stimulated by various external stimuli, such as pH value and temperature, have been proposed for liquid handling and transfer. However, most of such techniques still suffered from long responding time. More importantly, due to conventional irreversibility from Wenzel to Cassie state, most of their switching adhesion are ex-situ, which means a different liquid droplet is required to study the adhesion change after the switch (if the surface changes from adhesive to non-sticky, the droplet deposited before the switch will still be pinned, whereas a newly deposited droplet can roll off easily). Therefore, such smart surfaces are still not pragmatic for real-time droplet transfer. See for example, Cheng, Z., Lai, H., Du, M., Zhu, S., Zhang, N., & Sun, K., "Super-hydrophobic surface with switchable adhesion responsive to both temperature and pH," *Soft Matter,* 8(37), 9635-9641(2012), which is incorporated herein by reference in its entirety.

Several methods have been proposed to enable in-situ switchable solid/liquid adhesion for on-demand droplet capturing and releasing. For example, an adhesive superhydrophobic surface for superparamagnetic microdroplets, superhydrophobic "aspirators," and curvature-driven switching surfaces. However, these methods all have their drawbacks. Adhesive superhydrophobic surfaces for superparamagnetic microdroplets are only applicable to droplets containing magnetic nanomaterials. The inclusion of magnetic nanomaterials may impede analysis and may even be incompatible with chemical and biological components in the droplets. For superhydrophobic "aspirators," small droplets evaporate quickly due to generated negative pressure and their portability is impaired by an externally attached vacuum pump. Switching processes for curvature-driven switching surfaces are difficult to perform because a curvature has to be induced by deforming a surface from the backside. Moreover, none of these methods have proved to be able to manipulate oil droplets. See for example, Hong, X., Gao, X., & Jiang, L., "Application of superhydrophobic surface with high adhesive force in no lost transport of superparamagnetic microdroplet," *Journal of the American Chemical Society,* 129(6), 1478-1479 (2007); Guo, D., Xiao, J., Chen, J., Liu, Y., Yu, C., Cao, M., & Jiang, L. Superhydrophobic "Aspirator": Toward Dispersion and Manipulation of Micro/Nanoliter Droplets," *Small,* 11(35), 4491-4496 (2015); and Wu, D., Wu, S. Z., Chen, Q. D., Zhang, Y. L., Yao, J., Yao, X., & Sun, H. B., "Curvature-Driven Reversible In Situ Switching Between Pinned and Roll-Down Superhydrophobic States for Water Droplet Transportation," *Advanced Materials,* 23(4), 545-549 (2011), which are incorporated herein by reference in their entirety.

It would be advantageous to have a method that could prepare and manipulate tiny volumes of droplets in real-time, without the drawbacks of the prior art.

SUMMARY OF THE INVENTION

The present invention relates to a generic method for precise and rapid manipulation and transfer of tiny-volume liquid droplets. The transfer process is nearly loss-free.

The present invention is based on the dynamic introduction of microstructures with relatively high surface energy to a non-wettable surface. During manipulation, large adhesion can be generated by a capillary bridge formed between the liquid droplet and the micro-wettable domain. With such a micro-sized wettable domain exposed, a liquid droplet can be pinned firmly on the surface. To release the droplet, the microstructures are retracted from the non-wettable background surface. During retraction, liquid between microstructures will be repelled out by the non-wettable background surface. Depending on the surface chemistry of the microstructures, tiny capillary bridges will either pinch-off or recede from the microstructures. Without capillary bridges, adhesion between the droplet and non-wettable surface is negligible due to the Cassie state of the droplet. The in-situ adhesion switching is rapid and effortless.

The method of the invention can be applied to manipulate both water and oil droplets either in air or in an immiscible carrier liquid.

In an exemplary embodiment, a piece of mesh is treated to be liquid-repellent and is utilized as the background surface. Micro-fibers with wettability contrast are used as movable microstructures. The non-wettable mesh is then fixed on the top of a syringe. Several micro-fibers are bundled by a metal tube and are attached on the plunger of the syringe. By extending or withdrawing the plunger, micro-fibers can either penetrate or retract from the non-wettable mesh. With penetrating micro-fibers, an area or domain with local chemical properties modified, exhibits large adhesion towards liquid droplets. Thus, this adhesive state of the surface can successfully capture liquid droplets and reliably manipulate them. When micro-fibers are withdrawn, the liquid droplet only contacts the "slippery" background surface, which is in the Cassie state. Therefore, negligible surface adhesion of the mesh allows the droplet to be released and to separate from the surface due to gravitational force on them. Dynamic structural reconfiguration of the surface modifies surface chemistry reversibly, which leads to an in-situ adhesion switch of the surface attraction for droplets.

By using different numbers of micro-fibers and fibers with different surface chemistry, the adhesion of the surface can be tuned over a wide range. Corresponding to the change of adhesive force, liquid capacity of the surface can also be tuned.

With proper surface wettability treatment, the surface can be utilized to manipulate liquid droplets either in air or in an immiscible carrier liquid.

By controlling the numbers and protruding lengths of hydrophilic fibers on the surface, droplets with volumes down to the nano-liter scale can be prepared and dispensed.

The surface can be expanded by using a large fiber array. The expanded surface can handle and manipulate multiple droplets.

BRIEF DESCRIPTION OF THE DRAWINGS

The foregoing and other objects and advantages of the present invention will become more apparent when considered in connection with the following detailed description and appended drawings in which like designations denote like elements in the various views, and wherein:

FIG. 2A is a plot of adhesive force against the number of micro-fibers with different surface chemistry, FIG. 2B is a microscope image of capillary bridges formed between micro-fibers and water droplets, FIG. 2C is a plot of liquid capacity against the number of micro-fibers with different surface chemistry, and FIG. 2D is a plot of the volume of the droplets transferred by the surface against the volume of the droplets deposited directly from a micropipette, all with respect to the present invention.

FIG. 4A is a plot of adhesive force and sliding angle against cycles of extending and withdrawing, and FIG. 4B is a plot of contact angles against pH values of aqueous droplets.

FIGS. 5A-5C are a series of photographs showing manipulation processes (capture, merging and release) utilizing the surface for micro-reactor of the present invention.

FIG. 6A is an image of a liquid column trapped between hydrophilic fibers, FIG. 6B is a plot of the volume of the nanoliter droplets against the protruding length for surfaces with varied numbers of hydrophilic fibers, and FIG. 6C is a series of photographs showing the preparation and deposition of nanoliter droplets by using the present invention.

FIGS. 7A-7E are a series of photographs showing the manipulation of multiple droplets using the expanded surface.

DETAILED DESCRIPTION OF EXEMPLARY EMBODIMENTS OF THE INVENTION

Figure 1A:
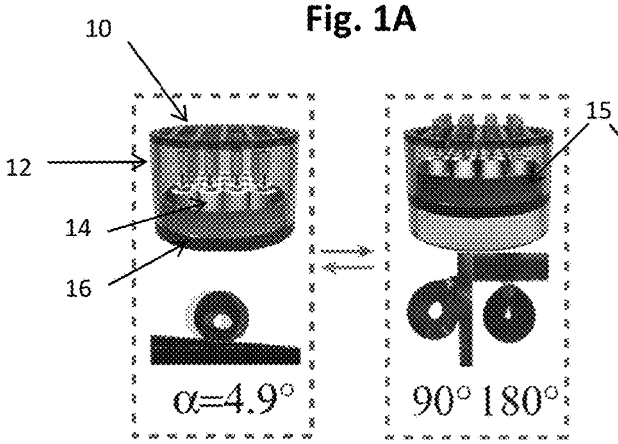
FIG. 1A is an illustration of a device for practicing the method of the present invention.
Figure 1B:
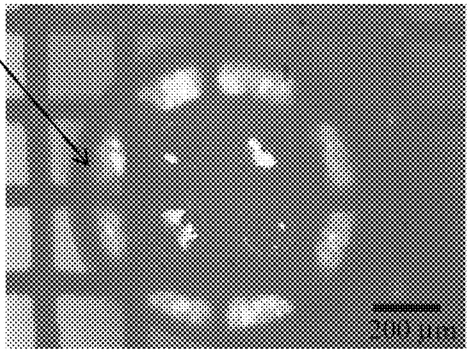
FIG. 1B is a microscope image of an assembly of micro-fibers with background mesh according to the present invention.
Figure 1C:
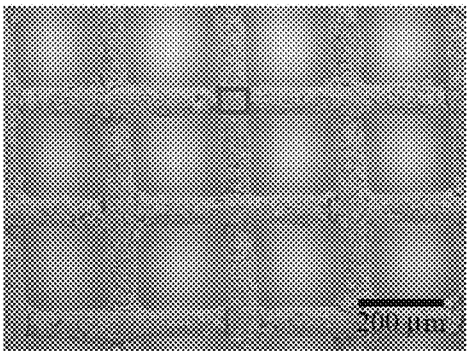
FIGS. 1C and 1D are scanning electron microscope images of treated superhydrophobic mesh surface at a 200 micron level and a 700 nanometer level, respectively.
Figure 1D:
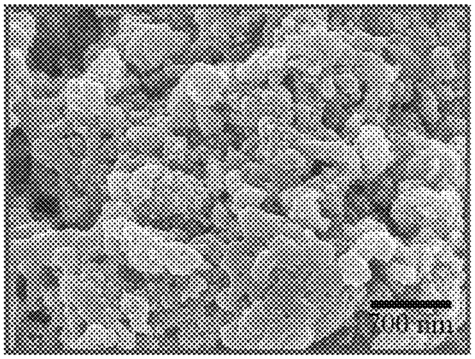
Figure 1E:
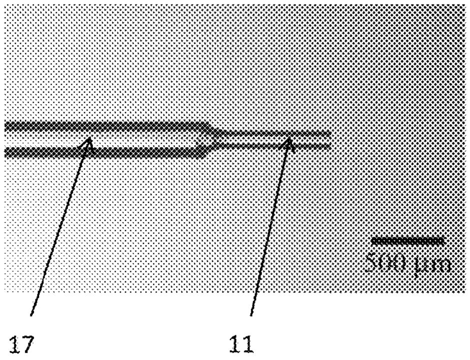
FIG. 1E is a microscope image of a single micro-fiber according to the invention.
Figure 1F:
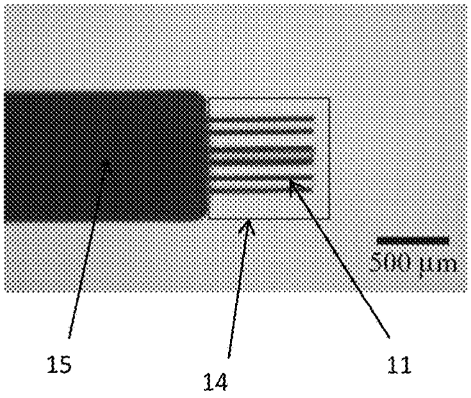
FIG. 1F is a microscope image of a bundle of micro-fibers according to the invention.

The assembly of the surface is illustrated in FIGS. 1A, 1B and 1E. A piece of polyester mesh 10, which has been weaved with 60 μm thick threads having an inter-thread distance of 200 μm serves as the background surface. The mesh is modified to be superhydrophobic by dip coating in a solution containing a mixture of 0.5 g polydimethylsiloxane (with 10% crosslinker), 0.5 g graphene nanoplatelets, 8 mL diethyl ether, and 7 mL ethanol. After curing at 80° C. for 2 hr, the mesh is cladded by a layer of graphene nanoplatelets and PDMS composites with micro- and nanoscale surface roughness. High surface asperities and low surface energy of the composite modify the mesh to be superhydrophobic with a water contact angle of about 151°. Then, the superhydrophobic mesh is fixed on top of a syringe 12 by commercial adhesives.

Small bundles 14 of 9/125 μm optical fibers (e.g., six fibers per bundle) with peeled tips are utilized as movable microstructures with contrast wettability. Inner quartz fibers 11 are exposed on fiber tips by peeling the protective jacket 17 with a fiber stripper. Then a specific number of optical fibers are tightly bound by a metal tube 15. The quartz fiber tips are spaced by 60 μm thick protective jacket 17 on the lower part of the optical fibers. Therefore, the fiber to fiber distance is about the same as the mesh pore to pore distance, which facilitates the alignment between fiber tips and mesh pores. The optical fiber bundle is then fixed on top of a plunger 16 of the syringe by using commercial adhesives. By extending or withdrawing the plunger, quartz fibers can either penetrate or retract from the superhydrophobic mesh 10. While 9/125 μm optical fibers are preferred, 50/125 and 62.6/125 and others may also be used.

An optical micrograph showing the structure of the mesh surface with 4 penetrating fibers is shown in FIG. 1B. FIG. 1C shows a scanning electron micrograph of a typical coated polyester mesh where the spacing is about 200 μm. FIG. 1D is a magnified scanning electron micrograph at a 700 nm level showing nanoscale roughness of the coating.

FIG. 1A exhibits two contrastive states of water droplet on such surface. With the quartz fiber array penetrating the mesh as in the right side view, the mesh surface has local high adhesion; water droplets will be firmly pinned by quartz fibers and cannot slide even when the surface is inverted as shown at the bottom of the right view. By withdrawing the quartz fiber bundles 14, droplets are only in contact with the superhydrophobic mesh 10 as shown in the left view of FIG. 1A. In this position an air cushion below the Cassie-state droplet leads to high mobility with a sliding angle as low as 4.9° as illustrated at the bottom of the left view in FIG. 1A. The switching of states of the water droplet on the surface is in-situ and rapid, and is controlled by the movement of the fiber bundles 14 due to movement of the plunger 16.

The adhesion of the adhesive state of the mesh surface has been measured. Two kinds of quartz fibers, intrinsic hydrophilic ones and octadecyltrichlorosilane (ODS) modified hydrophobic ones, were used in the surface measurement, respectively. The ODS treatment process is conducted by immersing quartz fiber tips in 10 mM ODS toluene solution for 15 min and followed by curing in a furnace at 100° C. for 30 min. By referring to FIG. 2A it can be seen that for both kinds of fibers, adhesive forces grow with an increasing number of fibers. Without exposed fibers, the superhydrophobic mesh exhibits adhesion of about 8.9 μN. Such a low adhesion allows easy detachment of droplets from the surface. With 6 fibers penetrating the mesh, adhesive forces of the surface for intrinsic and ODS modified fibers rise drastically to 100.2 μN and 72.3 μN, respectively. The high adhesion of the surface can firmly hold a tiny water droplet even when the surface is inverted.

When the water droplet contacts the exposed fiber a capillary bridge is formed. The high adhesion is the resultant force of interaction between surface tension around the base of the capillary bridge and the force generated by Laplace pressure, i.e., the pressure difference between the inside and the outside of the curved surface that forms the boundary between air and the liquid. When hydrophilic fibers are used, water wets and wraps the fiber array, which forms a liquid column. The base periphery of the capillary bridge is defined by the liquid column. By considering the interaction between surface tension and the force of Laplace pressure, the maximum adhesion is as following:

$$F_{hydrophilic} = \oint \gamma ds - \Delta P \cdot A$$

where s is circumference of the liquid column at base of the capillary bridge. γ is surface tension of water. ΔP is the Laplace pressure, which is roughly calculated by the contour of the stretched droplet. A is the cross-section area of base of the capillary bridge. The measured values are in good agreement with the proposed model.

By using hydrophobic ODS treated fibers, only a small capillary bridge forms at the top facet of each fiber. During stretching of the droplet, according to Gibbs criterion, the contact line of the capillary will recede on fiber facet only when the receding contact angle $\theta_r$ is reached. The receding contact angle $\theta_r$ for ODS modified fibers is measured to be about 96.4°. Thus, the adhesion for ODS modified fibers is as following:

$$F_{hydrophobic} = \sum_{i=1}^{n} \oint_{S_i} \gamma \sin\theta_i^d S_i - \Delta P \cdot A \cdot n$$

where s is the circumference of each quartz fiber, n is number of quartz fibers, and θ is the localized contact angle. Because of the interaction between neighboring capillary bridges, contact angles along the periphery of the quartz fiber will vary in the range of 96.4°≤θ<180°. FIG. 2B shows optical micrographs of the capillary bridges formed with 3 intrinsic or ODS treated quartz fibers.

As illustrated in FIG. 2C, the maximum liquid capacities of the surface have also been measured. The maximum droplet volume that the surface can hold when being inverted also grows with an increasing number of fibers. For 6 penetrating fibers, the liquid capacities are 11.8 μL and 7.3 μL for hydrophilic and hydrophobic quartz, respectively. The gravitational forces of the maximum droplet capacity correspond to adhesive forces of the surface. When the liquid volume exceeds the maximum value, the capillary bridge of the droplet will pinch-off due to instability.

To evaluate the droplet loss after the transfer process using the surface of the present invention, a comparison is made of the volume of droplets transferred by using the hydrophilic-fiber surface with that of the volume of droplets deposited directly from a micropipette. Droplets with a volume varying from 0.5-6 μL have been compared. The tests show that the volume of water droplets transferred by the surface is almost the same as that directly deposited. Thus, no obvious loss can be observed.

The insets in FIG. 2D show under a microscope the water residue after the withdrawal. For hydrophilic fibers, similar to some superhydrophobic surfaces, there is a minute amount of water residue on top of each fiber, which is caused by rupture of the capillary bridge. During the withdraw process, the superhydrophobic mesh repels water out of the spaces between the hydrophilic fibers, then the capillary bridge finally pinches off at the fiber facets. For a surface with hydrophobic fibers, the water contact line recedes on fibers once the receding contact angle has been reached. Therefore, as a result, the remaining amount of water on top of hydrophobic fibers is much less than that of hydrophilic ones. Compared with the volume of droplets, the volume loss during the transfer process by the surface of the present invention is negligible.

Figure 3A:
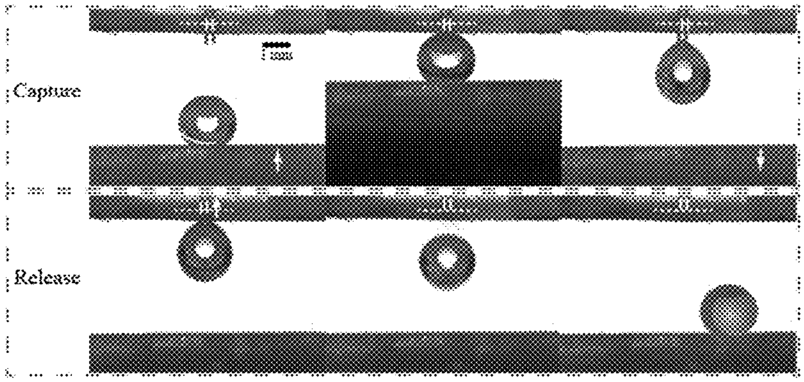
FIG. 3A is a series of photographs showing the capturing and releasing of a 5 μL water droplet.

The surface is used for manipulation and preparation of micro/nano-liter water droplets. The capture and release process of a microliter water droplet is illustrated in FIG. 3A. First, a 5 μL water droplet is placed on a superhydrophobic surface. Then the surface with 4 hydrophilic fibers is used to pick up the water droplet in air. The adhesion of the droplet to the fibers balances the gravitational force on the droplet, which guarantees reliable manipulation. To disengage the droplet, the fibers are withdrawn from the superhydrophobic mesh and the droplet is released back onto the superhydrophobic surface.

Figure 3B:
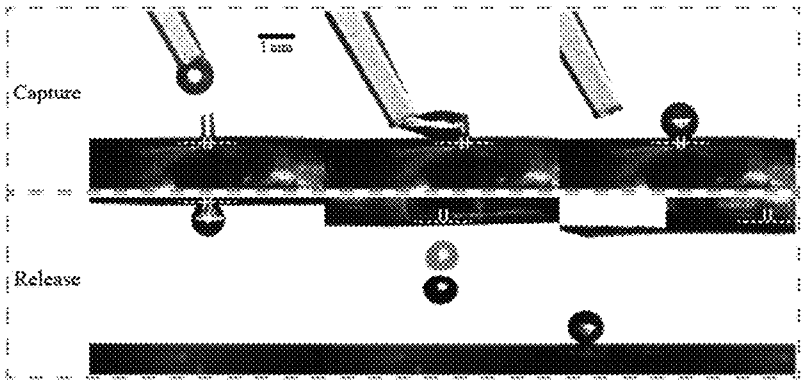
FIG. 3B is a series of photographs showing the preparation of a 0.5 μL water droplet from a commercial quantitative micropipette.

FIG. 3B is a series of photographs showing the preparation of 0.5 μL water droplet from a micropipette. For preparation of a nanoliter droplet, a 0.5 μL water droplet is first measured by a commercial quantitative pipette. Then the surface with 4 hydrophilic fibers is applied to capture the tiny water droplet directly from the tip of pipette. To transfer the 0.5 μL water droplet onto a superhydrophobic surface, the hydrophilic fibers are withdrawn. The droplet is then prepared on the target surface.

Figure 3C:
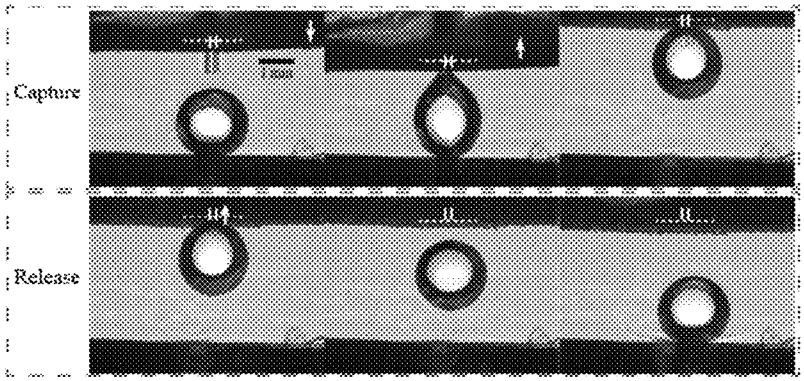
FIG. 3C is a series of photographs showing the capturing and releasing of a 5 μL oil droplet under water from a surface according to the present invention.

To manipulate oil droplets under water, the mesh is modified to be superoleophobic under water. The mesh is first dip coated in poly(ethyleneimine) (PEI) (0.1 g/mL) solution. After evaporation of PEI solution, the mesh is dip coated in sodium alginate solution (0.02 g/mL) and then immersed in $CaCl_2$ solution (1 M) for 10 min. After treatment, the mesh is covered by a layer of calcium alginate which leads to underwater superoleophobicity. Four ODS treated hydrophobic quartz fibers are used in the surface. Referring to FIG. 3C, a 5 μL 1,2-dichloroethane droplet is first placed on a piece of calcium alginate coated silicon wafer under water. Then, the surface with penetrating ODS treated fibers is utilized to stably pick up the oil droplet under water. The secure holding allows arbitrary manipulation and transportation of the oil droplet under water. To disperse it, the ODS treated fibers are withdrawn and the oil droplet is released back on the calcium alginate coated silicon wafer.

The application of the surface for droplet transfer is complemented by its good cycling durability and chemical resistance. In-situ rapid switching adhesion of the surface facilitates dexterous and precise liquid droplet handling, which is a critical step for droplet-based micro-reactors. Dynamic cyclic switching of the surface is illustrated in FIG. 4A. In that figure nine (9) cycles have been repeated. For each cycle, the sliding angles for 5 μL water droplets are 180° (pinned) and less than 10° for the adhesive and slippery states, respectively. Good cyclic switching ability can enable repeat and multistep operation of the surface. The slippery state of the surface is also proven to be resistant to droplets having pH values varying from 1 to 14. By referring to FIG. 4B, contact angles of droplets with pH values within such range are larger than 150°. The chemical resistance of the surface is empowered by good chemical stability of the superhydrophobic coating mixture.

The surface used for a droplet-based micro-reactor according to the present invention has proven effective for droplet-based micro-reaction as illustrated in FIG. 5. In FIG. 5A the release of a 2 μL $FeCl_3$ (0.75 M) solution droplet on a superhydrophobic surface is shown. The inset image shows the capture of the 2 μL $FeCl_3$ solution droplet from a pipette. FIG. 5B illustrates the merging (capture and mixing) of a 4 μL NaOH (1.5 M) solution droplet with the $FeCl_3$ solution droplet. The inset image in FIG. 5B shows the capture of the 4 μL NaOH solution droplet from a pipette. FIG. 5C illustrates the merged droplet containing generated red $Fe(OH)_3$ precipitates, released back on to the superhydrophobic surface.

By using hydrophilic micro-fibers, a liquid column can be trapped among fibers as illustrated in FIG. 6A. Then, by withdrawing fibers, the liquid column is repelled out and a tiny droplet is formed as illustrated in FIG. 6C. Such a process can be utilized to prepare liquid droplets with volumes down to the nano-liter scale, which is difficult for a commercial micropipette to achieve. The volume of a prepared liquid droplet is determined by the space among micro-fibers. Such space increases with increasing numbers and protruding lengths of micro-fibers. As illustrated in FIG. 6B, liquid droplets with volumes of 20-200 nL can be prepared by this method.

The surface can be expanded through utilization of a large fiber array. As shown in FIG. 7A, a brush composed of Dupont Tynex bristles can be used instead of a quartz fiber array. With this brush there is a protruded fiber array. Such an expanded surface can be used to manipulate multiple droplets in parallel. FIGS. 7B-7D shows three droplets of different volume being successively captured by using the expanded surface with the protruding fiber array. By retracting the fiber array, the three droplets are simultaneously released to the substrate below as shown in FIG. 7E.

While the present invention has been particularly shown and described with reference to preferred embodiments thereof, it will be understood by those skilled in the art that various changes in form and details may be made therein without departing from the spirit and scope of the invention.

What we claimed is:

1. Apparatus for the manipulation of micro/nanoliter water droplets, comprising:

a syringe;

a polyester mesh forming a superhydrophobic surface located at a distal end of the syringe;

a plunger slidably located within the syringe behind or proximally of the mesh;

at least one fiber located on the distal side of the plunger and being movable with the plunger, said at least one fiber being positioned so that it aligns with an open space or pore in the mesh, and whereby in a first position of the plunger the end of the at least one fibers is behind the mesh and in a second position of the plunger the end of the at least one fiber penetrates through the mesh and beyond its superhydrophobic surface.

2. The apparatus of claim 1 wherein the mesh comprises:

a weave of between about 40 and 80 μm thick threads having an inter-thread distance of between 150 and 200 μm;

a coating on the weave of a solution containing a mixture of polydimethylsiloxane (with crosslinker), graphene nanoplatelets, diethyl ether, and ethanol that has been cured at 60 to 100° C. for 1½ to 2½ hours; and a cladding layer of graphene nanoplatelets and PDMS composites with micro- and nanoscale surface roughness.

3. The apparatus of claim 1 wherein the mesh is fixed to the syringe by adhesives.

4. The apparatus of claim 1 wherein there are a plurality of fibers forming a fiber bundle, which fibers are optical fibers with peeled tips that expose an inner quartz fiber.

5. The apparatus of claim 4 wherein there are six 125 μm fibers forming a fiber bundle.

6. The apparatus of claim 4 wherein the fibers are one of intrinsic hydrophilic and octadecyltrichlorosilane (ODS) modified hydrophobic ones.

7. The apparatus of claim 1 wherein there are a plurality of fibers forming a fiber bundle, each fiber is arranged on the plunger to be aligned with openings or pores in the mesh so that the fiber-to-fiber distance is about the same as the mesh pore-to-pore distance, which facilitates alignment between the fiber tips and mesh pores; and wherein the distal ends of each of the fibers is bound by a metal tube where they contact the plunger.

8. The apparatus of claim 7 wherein there are four fibers.

9. The apparatus of claim 1 wherein there are a plurality of fibers forming a fiber bundle, each fiber is arranged on the plunger to be aligned with openings or pores in the mesh so that the fiber-to-fiber distance is about the same as the mesh pore-to-pore distance, which facilitates alignment between the fiber tips and mesh pores; and wherein the fibers are made of Dupont Tynex bristles that form a protruded fiber array when the plunger is in the second position so that the bristles penetrate through the mesh and beyond its superhydrophobic surface.

10. The apparatus of claim 1 wherein there are a plurality of fibers in the form of hydrophilic micro-fibers;

wherein the micro-fibers form a fiber bundle and a liquid column is formed by being trapped among the micro-fibers; and wherein by withdrawing the micro-fibers, the liquid column is repelled out and a tiny droplet is formed.

11. A method for rapidly and precisely manipulating tiny volumes of liquid droplets, comprising the steps of:

providing a movable microstructure with a background surface having a switchable wettability to non-wettability contrast;

moving the microstructure to the location of a droplet;

switching on the wettability to attract the droplet to the microstructure;

moving the microstructure with the attached droplet to a different location; and switching off the wettability in order to deposit the droplet at the different location.

12. The method of claim 11 wherein the strength of attraction of the droplet to the microstructure is tuned by controlling number and surface chemistry of microstructures.

13. The method of claim 11 wherein the microstructure is a superhydrophobic mesh with pores and quartz fibers that can be moved behind the mesh to make the microstructure non-wettable and through and in front of the mesh to make the microstructure wettable.

14. The method of claim 11 wherein the manipulation is in air or an immiscible carrier liquid.

15. The method of claim 14, wherein the manipulation is under water and the mesh is modified to be superoleophobic under water, wherein the mesh is prepared by the following steps:

dip coating the mesh in poly(ethyleneimine) (PEI) (0.1 g/mL) solution;

allowing evaporation of the PEI solution;

dip coating the mesh in sodium alginate solution (0.02 g/mL) and then immersing it in $CaCl_2$ solution (1 M) for 10 min; and after treatment, covering the mesh with a layer of calcium alginate, which leads to underwater superoleophobicity.

16. A method of making a mesh for the apparatus of claim 1, comprising the steps of:

weaving a polyester mesh with 40-80 μm thick threads having an inter-thread distance of 150-250 μm to form a background surface;

dipping the background surface in a solution containing a mixture of 0.5 g polydimethylsiloxane (with 10% crosslinker), 0.5 g graphene nanoplatelets, 8 mL diethyl ether, and 7 mL ethanol to make the mesh superhydrophobic; and curing the mesh at 80° C. for 2 hours so as to form a cladding layer of graphene nanoplatelets and PDMS composites with micro- and nanoscale surface roughness on the cured mesh.

17. A method of making the hydrophobic fiber bundles for the apparatus of claim 1, comprising the steps of:

immersing quartz fiber tips in 10 mM ODS toluene solution for 15 min; and curing the fibers in a furnace at 100° C. for 30 min.

* * * * *